(12) United States Patent
Ichikawa

(10) Patent No.: US 8,396,334 B2
(45) Date of Patent: Mar. 12, 2013

(54) OPTICAL WAVEGUIDE DEVICE

(75) Inventor: Junichiro Ichikawa, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/225,783

(22) PCT Filed: Mar. 6, 2007

(86) PCT No.: PCT/JP2007/054233
§ 371 (c)(1),
(2), (4) Date: Dec. 12, 2008

(87) PCT Pub. No.: WO2007/111085
PCT Pub. Date: Oct. 4, 2007

(65) Prior Publication Data
US 2009/0116781 A1    May 7, 2009

(30) Foreign Application Priority Data
Mar. 29, 2006 (JP) ................................. 2006-092293

(51) Int. Cl.
*G02F 1/01* (2006.01)
(52) U.S. Cl. .......................................................... 385/1
(58) Field of Classification Search ...................... 385/1
See application file for complete search history.

(56) References Cited

U.S. PATENT DOCUMENTS

| 2002/0048076 A1* | 4/2002 | Kondo et al. | ................. | 359/322 |
| 2003/0044100 A1* | 3/2003 | Kondo et al. | ..................... | 385/3 |
| 2003/0138180 A1 | 7/2003 | Kondo et al. | | |
| 2004/0264832 A1 | 12/2004 | Kondo et al. | | |
| 2005/0157983 A1 | 7/2005 | Aoki et al. | | |
| 2006/0110089 A1* | 5/2006 | Ichikawa et al. | .................. | 385/3 |
| 2007/0189669 A1* | 8/2007 | Tormen et al. | .................. | 385/37 |

FOREIGN PATENT DOCUMENTS

| JP | 64-018121 | 1/1989 |
| JP | 5-088123 | 4/1993 |
| JP | 5-264809 | 10/1993 |
| JP | 6-051254 | 2/1994 |
| JP | 6-186448 A | 7/1994 |

(Continued)

OTHER PUBLICATIONS

European Patent Office, Extended European Search Report for European Patent Application No. EP 07 73 7808, May 7, 2009. European Patent Office, Munich. Germany.

*Primary Examiner* — Uyen Chau N Le
*Assistant Examiner* — Hoang Tran
(74) *Attorney, Agent, or Firm* — Chapman and Cutler LLP

(57) ABSTRACT

An optical waveguide device having multiple functions or high performance, to improve the productivity of products, and to provide an optical waveguide device capable of suppressing deterioration of an operating characteristic of the optical waveguide device, including a thin plate 1 having a thickness of 20 μm or less and at least an optical waveguide 2 formed in the thin plate. The thin plate is bonded and fixed to a supporting substrate 5 with an adhesive 4 interposed therebetween, and a film having a higher refractive index than the thin plate and the adhesive is provided on a surface of the thin plate bonded and fixed to the supporting substrate so as to be in contact with at least a part of the optical waveguide. Preferably, the thin plate is formed of a material having a nonlinear optical effect or an electro-optical effect.

7 Claims, 3 Drawing Sheets

FOREIGN PATENT DOCUMENTS

| | | |
|---|---|---|
| JP | 6-289341 | 10/1994 |
| JP | 2002-258082 | 9/2002 |
| JP | 2003-215519 | 7/2003 |
| JP | 2006-309124 A | 11/2006 |
| WO | WO 99/64905 A1 | 12/1999 |
| WO | WO 02/48765 A1 | 6/2002 |

* cited by examiner

OPTICAL WAVEGUIDE DEVICE

TECHNICAL FIELD

The present invention relates to an optical waveguide device, and more particularly, to an optical waveguide device which uses a thin plate having a thickness of 20 μm or less and has at least an optical waveguide formed in the thin plate.

BACKGROUND ART

In an optical communication field or an optical measurement field, an optical waveguide device in which an optical waveguide or modulation electrodes are formed on a substrate having an electro-optical effect or the like has been often used in the related art.

In particular, since the amount of transmitted information tends to increase with the development of multimedia, it is necessary to widen a band of a light modulation frequency. In order to realize this, an external modulation method using an LN modulator or the like has been proposed. However, in order to widen the band of the LN modulator, it is necessary to realize speed matching between a light wave and a microwave, which is a modulated signal, and to reduce a driving voltage.

In order to solve the problems, it is known that a condition of speed matching between a microwave and a light wave is satisfied, and at the same time, a driving voltage is reduced by making a substrate thinner than in the related art.

In the following Patent Document 1 or 2, an effective refractive index of a microwave is reduced by providing an optical waveguide and modulation electrodes on a thin substrate (hereinafter, referred to as a 'first substrate') having a thickness of 30 μm or less and bonding another substrate (hereinafter, referred to as a 'second substrate') having a dielectric constant lower than the first substrate to the first substrate, such that the speed matching between the microwave and the light wave is realized and the mechanical strength of the substrate is maintained.
Patent Document 1: JP-A-64-18121
Patent Document 2: JP-A-2003-215519

In Patent Document 1 or 2, LiNbO$_3$ (hereinafter, referred to as 'LN') is mainly used for the first substrate and a material having a lower dielectric constant than LN, such as quartz, glass, and alumina, is mainly used for the second substrate. In the combination of these materials, temperature drift or DC drift according to a temperature change occurs due to a difference between coefficients of linear expansion. In order to eliminate such problem, Patent Document 2 discloses that the first substrate and the second substrate are bonded to each other using an adhesive having a coefficient of linear expansion close to the first substrate.

On the other hand, use of the optical waveguide device is not limited to the light modulator described above. The optical waveguide device is requested to have multiple functions, for example, to be used as a diffraction grating or a variable wavelength filter. In addition, the optical waveguide device is also requested to have high performance, for example, to monitor a control state of the optical waveguide device or an optical integrated circuit, in which a plurality of optical waveguide devices are provided.

For example, in a variable wavelength filter, not only an optical waveguide or an electrode is provided in an optical waveguide device, but also a titanium oxide layer and unevenness need to be formed on the optical waveguide in order to form the refractive index distribution which periodically changes along the optical waveguide as disclosed in Patent Document 3 or 4.
Patent Document 3: JP-A-5-88123
Patent Document 4: JP-A-5-264809

Moreover, in the optical integrated circuit, optical waveguides need to be bent near an end of a substrate, and accordingly, a reflecting means, such as a green lens, needs to be arranged on the end surface of the substrate. In addition, in order to monitor a light wave propagating through the optical waveguide device, it is necessary to provide an optical waveguide or a directional coupler for monitoring.

Thus, in order to realize an optical waveguide device having multiple functions or high performance, the number of optical waveguides or electrodes provided in the optical waveguide device increases and various kinds of films, unevenness shape, and the like increase. As a result, the optical waveguide device itself becomes complicated. Furthermore, if the members described above are formed on the thin plate described above, the thin plate is easily damaged due to a difference between coefficients of thermal expansion of the thin plate and each of the members or due to mechanical or thermal stress distortion caused by the complicated shape of the thin plate. As a result, problems that yield of products decreases, unnecessary stress is applied to the thin plate and an operating characteristic of the optical waveguide device deteriorates, and the like occur.

DISCLOSURE OF THE INVENTION

Problems to be Solved by the Invention

In order to solve the problems described above, it is an object of the invention to realize an optical waveguide device having multiple functions or high performance, to improve the productivity of products, and to provide an optical waveguide device capable of suppressing deterioration of an operating characteristic of the optical waveguide device.

Means for Solving the Problems

In order to solve the above problems, according to a first aspect of the invention, an optical waveguide device includes: a thin plate having a thickness of 20 μm or less; and at least an optical waveguide formed in the thin plate. The thin plate is bonded and fixed to a supporting substrate with an adhesive interposed therebetween, and a film having a higher refractive index than the thin plate and the adhesive is provided on a surface of the thin plate bonded and fixed to the supporting substrate so as to be in contact with or close to at least a part of the optical waveguide.

In addition, in the invention, 'on a surface' means not only a front surface of the thin plate, but also a front surface after forming a buffer layer, such as an SiO$_2$ film, on the thin plate is included.

Furthermore, in the invention, 'being in contact' means not only a state of direct contact, but also indirect contact realized through a buffer layer or the like is included.

According to a second aspect of the invention, in the optical waveguide device according to the first aspect, the thin plate is formed of a material having a nonlinear optical effect or an electro-optical effect.

According to a third aspect of the invention, in the optical waveguide device according to the first or second aspect, an electrode or a heater for controlling the intensity, wave front, or a phase of light propagating through the optical waveguide is formed on the other surface of the thin plate not bonded and fixed to the supporting substrate.

According to a fourth aspect of the invention, in the optical waveguide device according to any one of the first to third aspects, the film having a high refractive index is formed so as to be periodically separated in the guiding direction of the optical waveguide.

According to a fifth aspect of the invention, in the optical waveguide device according to the third aspect, a light detection means for detecting either scattered light from the optical waveguide formed with the film having a high refractive index or led-out light obtained by causing a part of light propagating through the optical waveguide to be led out by means of the film having a high refractive index and a control means for controlling a voltage or a current applied to the electrode on the basis of the amount of light detected by the light detection means are further included, and the intensity, the wave front, or the phase of light propagating through the optical waveguide is controlled.

According to a sixth aspect of the invention, in the optical waveguide device according to any one of the first to third aspects, the film having a high refractive index is formed in a strip line shape.

Effects of the Invention

According to the first aspect of the invention, the optical waveguide device includes the thin plate having a thickness of 20 μm or less and at least an optical waveguide formed in the thin plate, the thin plate is bonded and fixed to a supporting substrate with an adhesive interposed therebetween, and a film having a higher refractive index (hereinafter, referred to as a 'high refractive index film') than the thin plate and the adhesive is provided on a surface of the thin plate bonded and fixed to the supporting substrate so as to be in contact with or close to at least a part of the optical waveguide. Accordingly, it becomes possible to configure various kinds of members, such as an optical waveguide and a diffraction grating, using the high refractive index film, and it becomes also possible to arrange various kinds of members on both surfaces of the thin plate. As a result, an optical waveguide device having multiple functions and high performance can be easily realized. In addition, since it is possible to suppress local concentration of mechanical or thermal stress in the thin plate, it is possible to prevent the thin plate from being damaged or an operating characteristic of the optical waveguide device from changing. As a result, it becomes possible to provide an optical waveguide device which is excellent in terms of productivity and has an operating characteristic that is stabilized.

According to the second aspect of the invention, since the thin plate is formed of a material having a nonlinear optical effect or an electro-optical effect, it becomes possible to provide various kinds of optical waveguide devices, such as an optical harmonic generator, a light modulator, a variable wavelength filter, or an optical switch.

According to the third aspect of the invention, since the electrode or the heater for controlling the intensity, the wave front, or the phase of light propagating through the optical waveguide is formed on the other surface of the thin plate not bonded and fixed to the supporting substrate, it becomes possible to provide various kinds of optical waveguide devices, such as an optical harmonic generator, a light modulator, a variable wavelength filter, or an optical switch.

According to the fourth aspect of the invention, since the high refractive index film is formed so as to be periodically separated in the guiding direction of the optical waveguide, the high refractive index film can function as a diffraction grating. As a result, it becomes possible to obtain an optical waveguide device, such as a wavelength filter.

According to the fifth aspect of the invention, the light detection means for detecting either the scattered light from the optical waveguide formed with the high refractive index film or the led-out light obtained by causing a part of light propagating through the optical waveguide to be led out by means of the high refractive index film and a control means for controlling a voltage or a current applied to the electrode on the basis of the amount of light detected by the light detection means are further included, and the intensity, the wave front, or the phase of light propagating through the optical waveguide is controlled. Accordingly, it becomes possible to provide a high-performance optical waveguide device capable of monitoring a light wave propagating inside the optical waveguide device and controlling a driving state of the optical waveguide device.

According to the sixth aspect of the invention, since the high refractive index film is formed in the strip line shape, the high refractive index film can be used as an optical waveguide. Thus, since the high refractive index film can be used as a bent optical waveguide or the like, it becomes possible to provide a high-performance optical waveguide device.

REFERENCE NUMERALS

Figure 1:
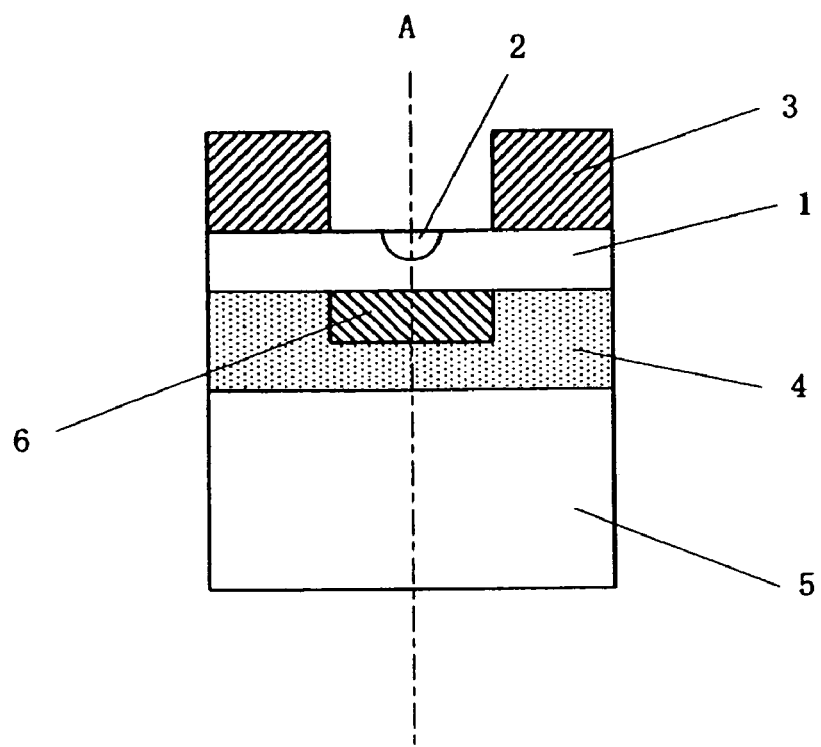
FIG. 1 is a cross-sectional view illustrating an optical waveguide device according to an embodiment of the invention.

1: thin plate
2: optical waveguide
3: modulation electrode
4: bonding layer
5: supporting substrate
6: high refractive index film

BEST MODE FOR CARRYING OUT THE INVENTION

Hereinafter, the invention will be described in detail using preferred examples.

FIG. 1 shows an optical waveguide device according to an embodiment of the invention. FIG. 1 is a cross-sectional view illustrating a light modulation device that includes a thin plate 1, which is formed of a material having an electro-optical effect or a nonlinear optical effect and has a thickness of 20 μm or less, an optical waveguide 2 formed on a front surface of the thin plate, and a control electrode 3 which is formed on the front surface of the thin plate and is used to control light passing through the optical waveguide. In addition, the optical waveguide 2 may be formed on a bottom surface of the thin plate 1, and a heater may be used instead of the control electrode 3 depending on the type of the optical waveguide device.

A supporting substrate 5 is bonded to the thin plate 1 with an adhesive 4 interposed therebetween.

As a method of forming the optical waveguide 2, the optical waveguide 2 can be formed by diffusing, for example, Ti on a substrate surface using a thermal diffusion method, a proton exchange method, or the like. In addition, as disclosed in Patent Document 5, the optical waveguide may also be configured by forming a ridge on a front surface of the thin plate 1 according to the shape of the optical waveguide.

A signal electrode or a grounding electrode or the control electrode 3, such as a DC electrode, may be formed by formation of an electrode pattern using Ti and Au and a metal plating method, for example. Moreover, if necessary, it may also be possible to provide a buffer layer (not shown) formed of a dielectric material, such as $SiO_2$, on a substrate surface after forming an optical waveguide and to form a control electrode on the buffer layer.

Patent Document 5: JP-A-6-289341

Materials having an electro-optical effect include a lithium niobate, a lithium tantalate, a PLZT (lead lanthanum zirconate titanate), a quartz, and a combination thereof, for example. In particular, lithium niobate (LN) crystal having a high electro-optical effect is preferably used.

In addition, materials having a nonlinear optical effect include an ADP (ammonium dihydrogen phosphate), $Ba_2NaNb_5O_{15}$ (barium-sodium niobate), CdSe (cadmium selenide), a KDP (potassium dihydrogen phosphate), $LiNbO_3$ (lithium niobate), Se (selenium), and Te (tellurium), for example.

In a method of manufacturing the thin plate 1 including a light modulation device, the optical waveguide described above is formed on a substrate having a thickness of hundreds of micrometers and a bottom surface of the substrate is grinded, thereby forming a thin plate having a thickness of 20 µm or less. Then, a modulation electrode is formed on the front surface of the thin plate. In addition, the bottom surface of the substrate may be grinded after forming the optical waveguide, the modulation electrode, or the like. In addition, if a thermal impact when forming an optical waveguide or a mechanical impact caused by handling of a thin film in various kinds of processing is applied, there is a risk that a thin plate will be damaged. For this reason, it is preferable to perform processing in which such thermal or mechanical impact is easily applied before grinding a substrate to make the substrate have a small thickness.

Various kinds of materials may be used for the supporting substrate 5. For example, in addition to the same material as the thin plate, materials having lower dielectric constants than the thin plate, such as a quartz, glass, and an alumina, may be used, or materials having different crystal orientation from the thin plate may also be used as disclosed in Patent Document 4. In this case, it is preferable to select a material having the same coefficient of linear expansion as the thin plate in order to stabilize a modulation characteristic of a light modulation device with respect to a temperature change. If it is difficult to select the same material, a material having the same coefficient of linear expansion as the thin plate is selected for an adhesive used to bond the thin plate and the supporting substrate as disclosed in Patent Document 2.

In order to bond the thin plate 1 and the supporting substrate 5 to each other, various kinds of adhesive materials, such as an epoxy-based adhesive, a thermosetting adhesive, an ultraviolet curable adhesive, solder glass, a thermosetting resin adhesive sheet, a light curable resin adhesive sheet, or a light-viscosity resin adhesive sheet may be used as the bonding layer 4. A refractive index of the bonding layer 4 is preferably lower than that of the thin plate 1, especially, that of the optical waveguide 2 in order to suppress a propagation loss of the optical waveguide 2.

As shown in FIG. 1, the optical waveguide device according to the invention is characterized in that a film (high refractive index film) 6, which has a refractive index higher than those of the thin plate 1 and an adhesive, is provided on a surface (lower surface of the thin plate 1 shown in FIG. 1) of the thin plate 1 bonded and fixed to the supporting substrate 5 so as to be in contact with or close to at least a part of the optical waveguide 2.

Various kinds of shapes or materials may be used for the high refractive index film according to functions and characteristics of the optical waveguide device. Hereinafter, an embodiment in which a high refractive index film is used will be described.

Figure 2:
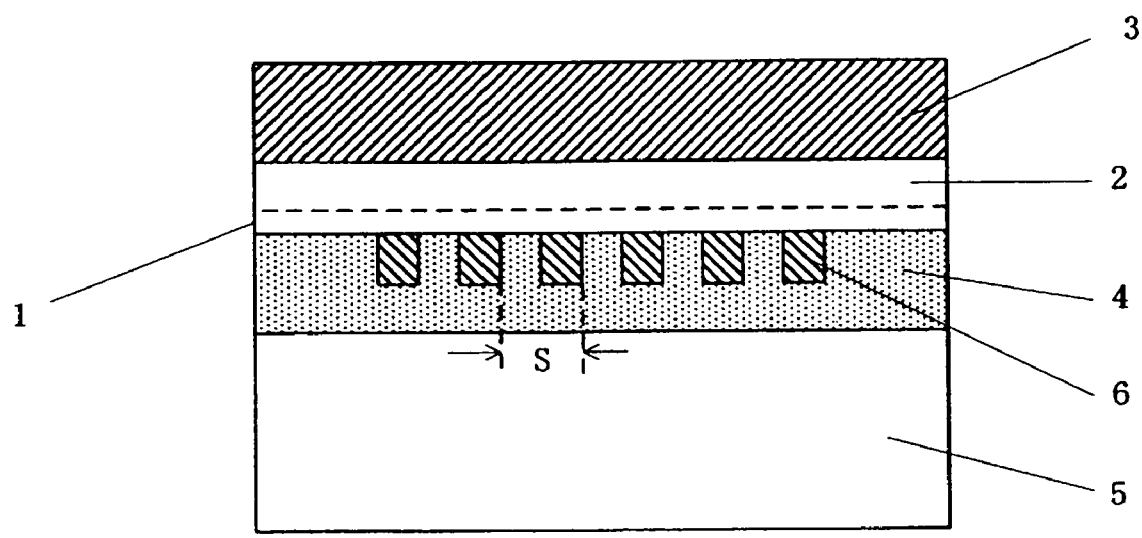
FIG. 2 is a cross-sectional view illustrating an optical waveguide device according to a first embodiment of the invention.

FIG. 2 is a cross-sectional view illustrating an optical waveguide device according to a first embodiment of the invention and shows an example of the cross-sectional shape of the optical waveguide device taken along a dashed-dotted line A of FIG. 1.

High refractive index films 6 are formed on a lower surface of the thin plate 1 at a predetermined period (distance s) therebetween. Due to the shape of such high refractive index film, the high refractive index film functions as a diffraction grating with respect to the optical waveguide 2, and the optical waveguide device can operate as a wavelength filter.

A wavelength λ to be selected is determined by the relationship of $\lambda = 2\,ns/m$ (where 'n' is an effective refractive index of a light wave, 's' is an array period of high refractive index films, and 'm' is a natural number). In addition, it is possible to change the wavelength to be selected by changing the intensity of an electric field applied by the electrode 3. In this case, the optical waveguide device functions as a variable wavelength filter.

In addition, interaction between the optical waveguide 2 and the high refractive index film 6 may be reinforced by forming the optical waveguide 2 on a bottom surface of the thin plate 1 such that the optical waveguide 2 comes into direct contact with the high refractive index film. Moreover, if necessary, it is also possible to form a thin buffer layer between the high refractive index film 6 and the optical waveguide 2 formed on the bottom surface of the thin plate 1.

Furthermore, when the thickness of the thin plate 1 is set to 20 µm or less, especially, to 10 µm or less, the mode diameter of a light wave propagating through the optical waveguide 2 is almost equal to the thickness of the thin plate 1. Accordingly, even if the optical waveguide is formed on either a front surface or a bottom surface of the thin plate 1, the influence of the contain electrode 3 or the high refractive index film 6 on a light wave propagating through the optical waveguide is equal.

Figure 3:
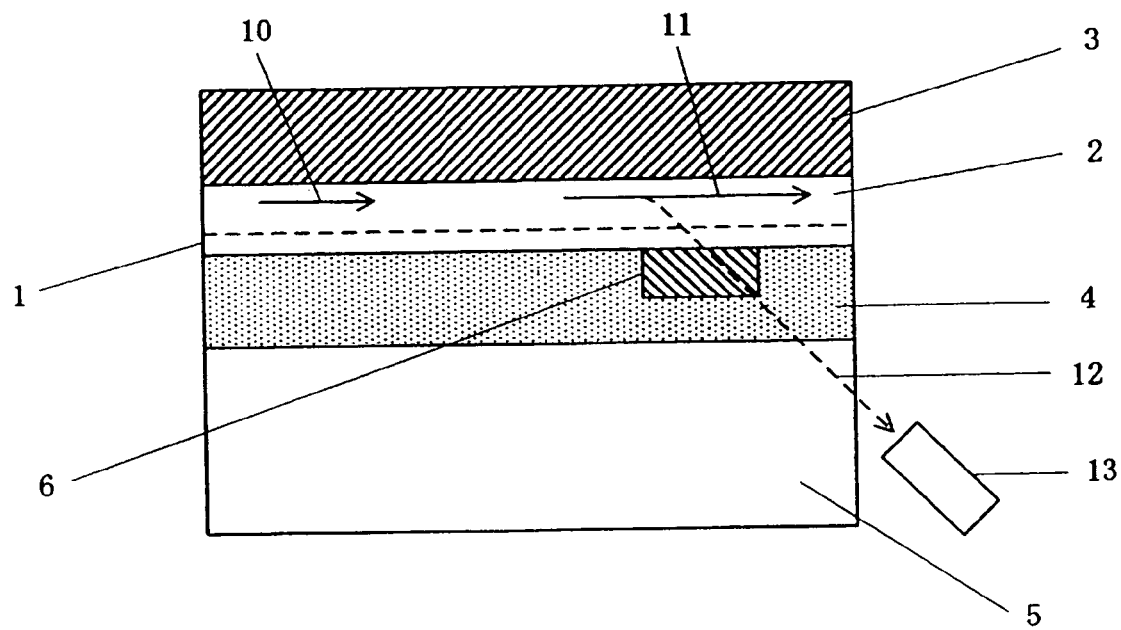
FIG. 3 is a cross-sectional view illustrating an optical waveguide device according to a second embodiment of the invention.

FIG. 3 is a cross-sectional view illustrating an optical waveguide device according to a second embodiment of the invention and shows an example of the cross-sectional shape of the optical waveguide device taken along the dashed-dotted line A of FIG. 1.

The high refractive index film 6 is arranged so as to be in contact with or close to a part of the optical waveguide 2, and a part of electric waves 10 propagating through the optical waveguide 2 is led to the outside of the optical waveguide device as indicated by a dotted line 12. A part of light waves is led to the outside, but the remaining light waves 11 keep propagating through the optical waveguide. Therefore, a state of light waves propagating inside the optical waveguide device can be easily monitored and determined by detecting the led-out light 12 with a photodetector 13.

The shape of the high refractive index film 6 shown in FIG. 3 is not limited to only the thing of a rectangular parallelepiped. For example, even if the shape is an irregular or indefinite one, a high refractive index film exists near the optical waveguide 2, and accordingly, electric waves that propagate are disordered and a part of light waves is output as scattered light.

According to a result detected by the photodetector 13, a voltage or a current applied to the control electrode 3 is controlled by a control circuit. As a result, the intensity, wave front, or a phase of light propagating inside the optical waveguide device is maintained in a predetermined state.

Figure 4:
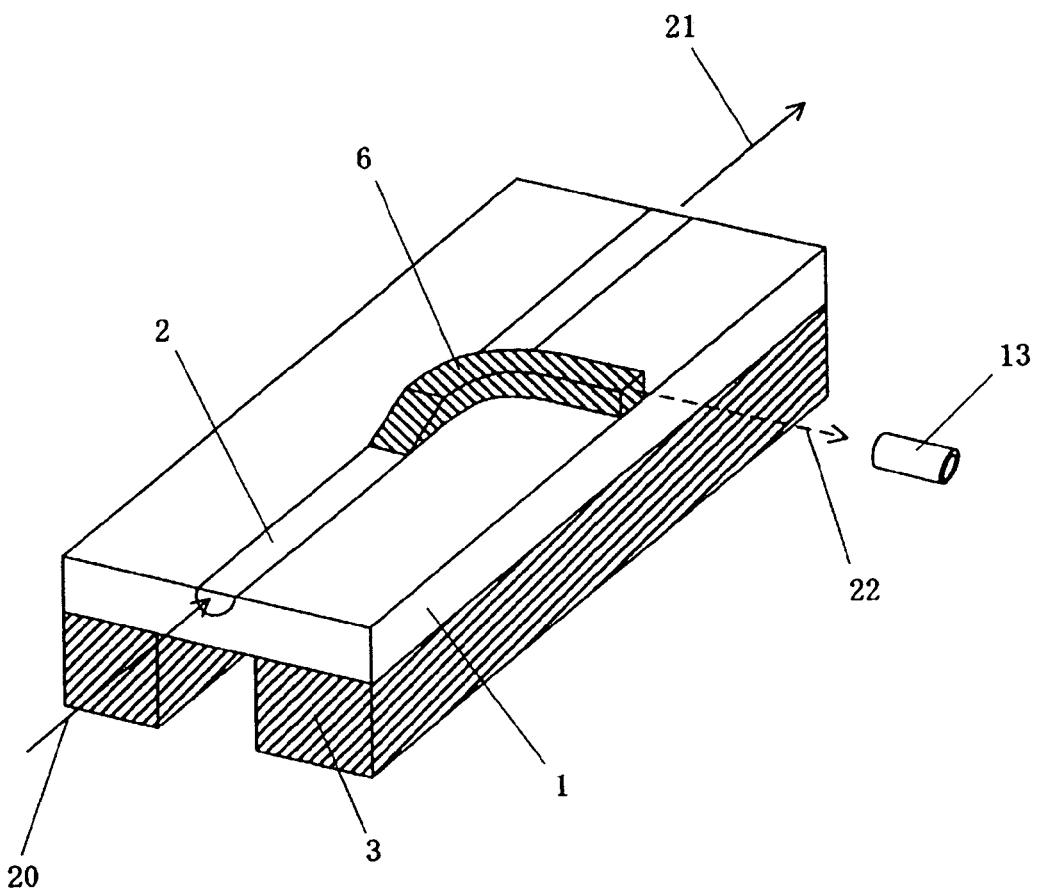
FIG. 4 is a perspective view illustrating an optical waveguide device according to a third embodiment of the invention.

FIG. 4 illustrates an optical waveguide device according to a third embodiment of the invention.

In FIG. 4, the supporting substrate 5 and the bonding layer 4 included in the optical waveguide device are omitted in order to clearly show the appearance of the high refractive index film formed on a surface of the thin plate 1. In addition, the bonding layer and the supporting substrate are arranged at an upper side of the thin plate 1 shown in FIG. 4.

The optical waveguide 2 is formed on a surface of the thin plate 1, and the control electrode 3 is formed on the other surface of the thin plate 1. The high refractive index film 6 that is in contact with the optical waveguide 2 and has a strip line shape is formed in a shape shown in FIG. 4. The high refractive index film 6 becomes thick along the optical waveguide 2 and is bent in the middle so as to be separated from the optical waveguide 2.

By providing the high refractive index film 6, a part of light waves 20 incident on the optical waveguide 2 moves from the optical waveguide 2 to the high refractive index film 6 and is then output as led-out light 22 from the other end of the high refractive index film 6 to the outside of the optical waveguide device. Since a material having a low refractive index, which serves as a bonding layer, is filled around the high refractive index film 6, the optical waveguide having the high refractive index film 6 as a core is formed.

As described above, the led-out light 22 is detected by the photodetector 13 and is used to monitor a state of the optical waveguide device, for example. The remaining light waves that were not led out to the high refractive index film keep propagating through the optical waveguide 2 and are output as output light 21 to the optical waveguide device.

Figure 5:
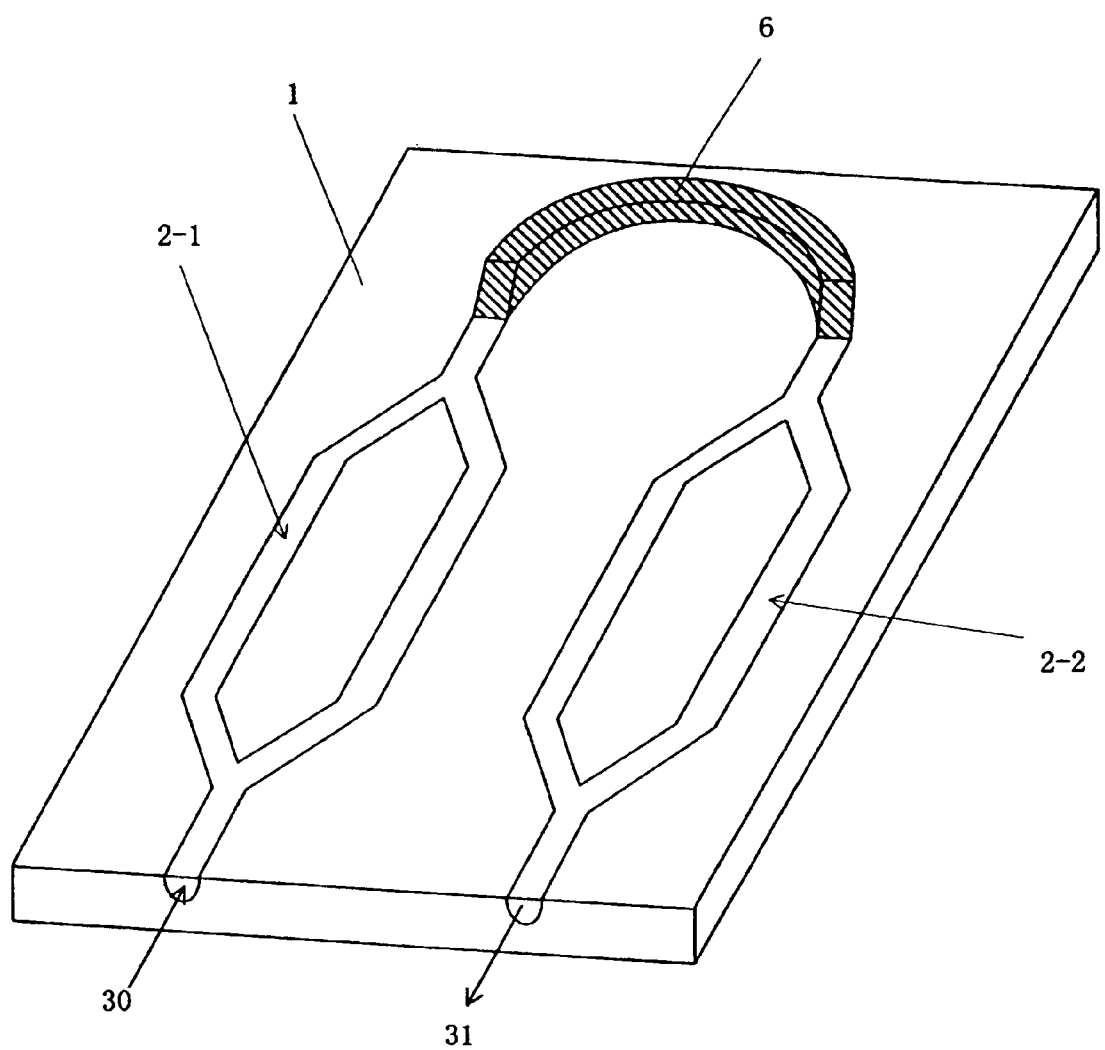
FIG. 5 is a perspective view illustrating an optical waveguide device according to a fourth embodiment of the invention.

FIG. 5 illustrates an optical waveguide device according to a fourth embodiment of the invention.

In FIG. 5, the electrode 3, the supporting substrate 5, and the bonding layer 4 included in the optical waveguide device are omitted in order to clearly show the appearance of the high refractive index film formed on a surface of the thin plate 1. In addition, the bonding layer and the supporting substrate are arranged at an upper side of the thin plate 1 shown in FIG. 4, and the electrode is arranged at a lower side of the thin plate 1.

Two Mach-Zehnder optical waveguides 2-1 and 2-2 are formed in the thin plate 1. Here, the optical waveguide 2-1 and the optical waveguide 2-2 are not connected continuously to each other.

On a surface of the thin plate 1, the high refractive index film 6 that is in contact with the optical waveguides 2-1 and 2-2 and has a strip line shape is formed in a shape shown in FIG. 5. The high refractive index film 6 becomes thick along the optical waveguides 2-1 and 2-2 and is bent such that the optical waveguides 2-1 and 2-2 are connected to each other.

By providing the high refractive index film 6, a light waves 30 incident on the optical waveguide 2-1 moves from the optical waveguide 2-1 to the high refractive index film 6 at an end of the optical waveguide 2-1 and is then introduced into the optical waveguide 2-2 from the other end of the high refractive index film 6. The light wave introduced into the optical waveguide 2-2 is output as output light 31 of the optical waveguide device to the outside of the optical waveguide device.

The refractive index of the high refractive index film 6 is higher than that of the optical waveguide 2-1 (or 2-2), and the refractive index of the bonding layer surrounding the high refractive index film 6 is lower than that of the thin plate 1 surrounding the optical waveguide 2-1. Accordingly, the optical waveguides 2-1 and 2-2 can be connected to each other through the high refractive index film 6 with smaller curvature than in a case in which the end of the optical waveguide 2-1 is bent to be connected to the optical waveguide 2-2. With the configuration shown in FIG. 5, it becomes possible to make an optical integrated circuit, in which a light modulator and the like are integrated, compact.

For example, semiconductors, such as $Nb_2O_5$, $TiO_2$, $Ta_2O_5$, $As_2S_3$, and Si, may be preferably used for the high refractive index film 6 described above, and a reactive RF sputtering method may be used when forming the high refractive index film 6.

INDUSTRIAL APPLICABILITY

As described above, according to the invention, it becomes possible to realize an optical waveguide device having multiple functions or high performance, to improve the productivity of products, and to provide an optical waveguide device capable of suppressing deterioration of an operating characteristic of the optical waveguide device.

The invention claimed is:

1. An optical waveguide device comprising
a thin plate having a thickness of 20 µm or less, and
at least an optical waveguide formed in a top surface of the thin plate,
wherein the thin plate is bonded and fixed to a supporting substrate with a bonding layer interposed therebetween, characterized in that
a bottom surface of the thin plate is bonded and fixed to the supporting substrate by the bonding layer, and said bottom surface of the thin plate is a different surface than the top surface in which the optical waveguide is formed, and
a film made of materials other than metal, and having a higher refractive index than the thin plate and the bonding layer, is bonded and fixed directly to the thin plate so as to be close to a part of the optical waveguide, and the bonding layer surrounds all other sides of the film.

2. The optical waveguide device according to claim 1, wherein the thin plate is formed of a material having a nonlinear optical effect or an electro-optical effect.

3. The optical waveguide device according to claim 1, wherein an electrode or a heater for controlling the intensity, wave front, or a phase of light propagating through the optical waveguide is formed on the other surface of the thin plate not bonded and fixed to the supporting substrate.

4. The optical waveguide device according to claim 1, wherein the film having a high refractive index is formed so as to be periodically separated in the guiding direction of the optical waveguide.

5. The optical waveguide device according to claim 3, further comprising:
a light detection means for detecting either scattered light from the optical waveguide formed with the film having a high refractive index or led-out light obtained by causing a part of light propagating through the optical waveguide to be led out by means of the film having a high refractive index; and a control means for controlling a voltage or a current applied to the electrode on the basis of the amount of light detected by the light detection means, wherein the intensity, the wave front, or the phase of light propagating through the optical waveguide is controlled.

6. The optical waveguide device according to claim 1, wherein the film having a high refractive index is formed in a strip line shape.

7. The optical waveguide device according to claim 1, wherein the film is made of high dielectric constant material.

* * * * *